US010055463B1

United States Patent
Chandrasekaran et al.

(10) Patent No.: US 10,055,463 B1
(45) Date of Patent: Aug. 21, 2018

(54) FEATURE BASED RANKING ADJUSTMENT

(71) Applicant: Google LLC, Mountain View, CA (US)

(72) Inventors: Hariharan Chandrasekaran, Sunnyvale, CA (US); Madhavi Yenugula, La Jolla, CA (US); Harish Chandran, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 387 days.

(21) Appl. No.: 14/946,233

(22) Filed: Nov. 19, 2015

Related U.S. Application Data

(60) Provisional application No. 62/248,018, filed on Oct. 29, 2015.

(51) Int. Cl.
*G06F 17/30* (2006.01)

(52) U.S. Cl.
CPC .... *G06F 17/3053* (2013.01); *G06F 17/30864* (2013.01)

(58) Field of Classification Search
CPC .............. G06F 17/3053; G06F 17/30864
See application file for complete search history.

(56) References Cited

U.S. PATENT DOCUMENTS

| | | | |
|---|---|---|---|
| 8,407,178 B2 | 3/2013 | Hicks | |
| 8,572,094 B2 * | 10/2013 | Luo | G06Q 10/10 707/748 |
| 2011/0191314 A1 * | 8/2011 | Howes | G06F 17/30864 707/706 |
| 2011/0246457 A1 * | 10/2011 | Dong | G06Q 10/06 707/725 |
| 2014/0303839 A1 * | 10/2014 | Filev | G06F 3/0481 701/36 |
| 2014/0304635 A1 * | 10/2014 | Kristinsson | G06F 3/0484 715/771 |
| 2015/0293976 A1 * | 10/2015 | Guo | G06F 17/30554 707/706 |
| 2015/0370798 A1 * | 12/2015 | Ju | G06F 17/30867 707/748 |
| 2017/0116200 A1 * | 4/2017 | Berkhim | G06F 17/3053 |
| 2017/0270586 A1 * | 9/2017 | Dumon | G06F 17/30979 |

FOREIGN PATENT DOCUMENTS

WO   WO2011005626 A3   3/2011

OTHER PUBLICATIONS

Klimis Ntalianis et al., "Social Media Content Ranking based on Social Computing and User Influence", ScienceDirect, pp. 148-157 (Year: 2015).*

Lad et al., 'Learning to Rank Relevant and Novel Documents through User Feedback,' CIKM' 10, Oct. 26-30, 2010, Toronto, Ontario, Canada. ACM 978-1-4503-0099-5/10/10, 10 pages.

* cited by examiner

*Primary Examiner* — Jared M Bibbee

(74) *Attorney, Agent, or Firm* — Fish & Richardson P.C.

(57) ABSTRACT

Methods, systems, and apparatus, including computer programs encoded on a computer storage medium, for feature-based ranking adjustment. In one aspect, a method includes finalizing rankings of resources based on detected features, and for each resource for which a ranking is not finalized, finalizing the respective resources or demoting the resources based on the detection of features common to the resources with the finalized rankings and the resources with the unfinalized rankings.

19 Claims, 9 Drawing Sheets

FEATURE BASED RANKING ADJUSTMENT

CROSS-REFERENCE TO RELATED APPLICATIONS

This application claims the benefit under 35 U.S.C. § 119(e) of U.S. Patent Application No. 62/248,018, titled "FEATURE BASED RANKING ADJUSTMENT," filed Oct. 29, 2015. The disclosure of the foregoing application is incorporated herein by reference in its entirety for all purposes.

TECHNICAL FIELD

This specification relates to adjusting rank positions of resources that are ranked with respect to each other.

BACKGROUND

The Internet enables access to a wide variety of resources, such as video or audio files, web pages for particular subjects, posts, and streams. A search system can identify resources that may be of interest to a user. For example, a search system may identify documents and web pages in response to a user query that includes one or more search terms or phrases, or may use a user profile to identify posts and other content to be provided on the user's personal network resource, such as a social network environment. The search system ranks the resources based on their relevance, as determined by an appropriate ranking algorithm, and provides the resources (or links to the content in the form of search results), according to the ranking.

Typically a robust search algorithm performs well over a wide variety of resources. However, sometimes particular features in a particular set of resources may be quite important in determining the search scores for the resources. This may result in "crowding" of similar types of content. While such crowding may be beneficial for some searches, there are other situations in which diversity among the features in the resources to be provided to the user is desired. For example, in the context of a social network page, it may be desirable to provide resources that are diverse with respect to a particular feature that is indicative of a user's social network friends or posts of other users that the user follows. Such diversity is desirable because most users do not want to see, as suggested interest topics, numerous posts from the same user in an uninterrupted sequence.

SUMMARY

In general, one innovative aspect of the subject matter described in this specification can be embodied in methods that include the actions of receiving data describing, for each resource in a set of resources ordered in ordinal positions and to be provided to a user device: a first rank value of the resource relative to first ranks of other resources in the set and defining an ordinal position of the resource relative to the other resources in the set; and a feature list that describes features of the resource, each feature being an identified attribute of the resource; determining relative to first ranks of other resources that a resource with a particular first rank value has a finalized ranking and that other resources in the set do not have a finalized ranking; determining, relative to other ordinal positions, for each feature of the resources with a finalized ranking, a particular ordinal position of a resource with a finalized ranking that has the feature; selecting resources not having a finalized ranking, the selections in a directional order of the ordinal positions, and for each selection determining whether to finalize the ranking of the resource or to demote the resource; in response to determining to demote the resource, demoting the resource to a demoted ordinal position relative to an ordinal position of another resource having a finalized ranking and a feature matching a feature of the resource; in response to determining to finalize the ranking of the resource: finalizing the ranking of the resource so that it is subsequent in ordinal position to a resource for which the ranking was previously finalized; and determining, relative to other ordinal positions for each feature of the resources with a finalized ranking, a particular ordinal position of a resource with a finalized ranking that has the feature; providing, to the user device, at least one of the resources according to the finalized ranking Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By using the rank positions of the resources instead of the relevance scores of the resources, the feature based ranking adjustment ensures that the resources are provided according to a desired feature diversity relative to features and rank positions of previously provided resources. This overcomes feature-based demotion schemes that do not take into account a rank position of a previously provided resource, and instead adjusts underlying search scores when features are present in a resource. These later schemes may demote resources that are at rank positions that already satisfy desired feature diversity conditions. For example, a resource ranked first with a feature F will cause demotions in a resource ranked at position 100 with the same feature.

Another advantage is the system allows for explicit, per-feature control over how many positions a resource is to be demoted. This also limits the ability of a previously-provided resource having a demotion influence on a resource ranked at a position lower than a demotion range as measured from the rank of the previously provided resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
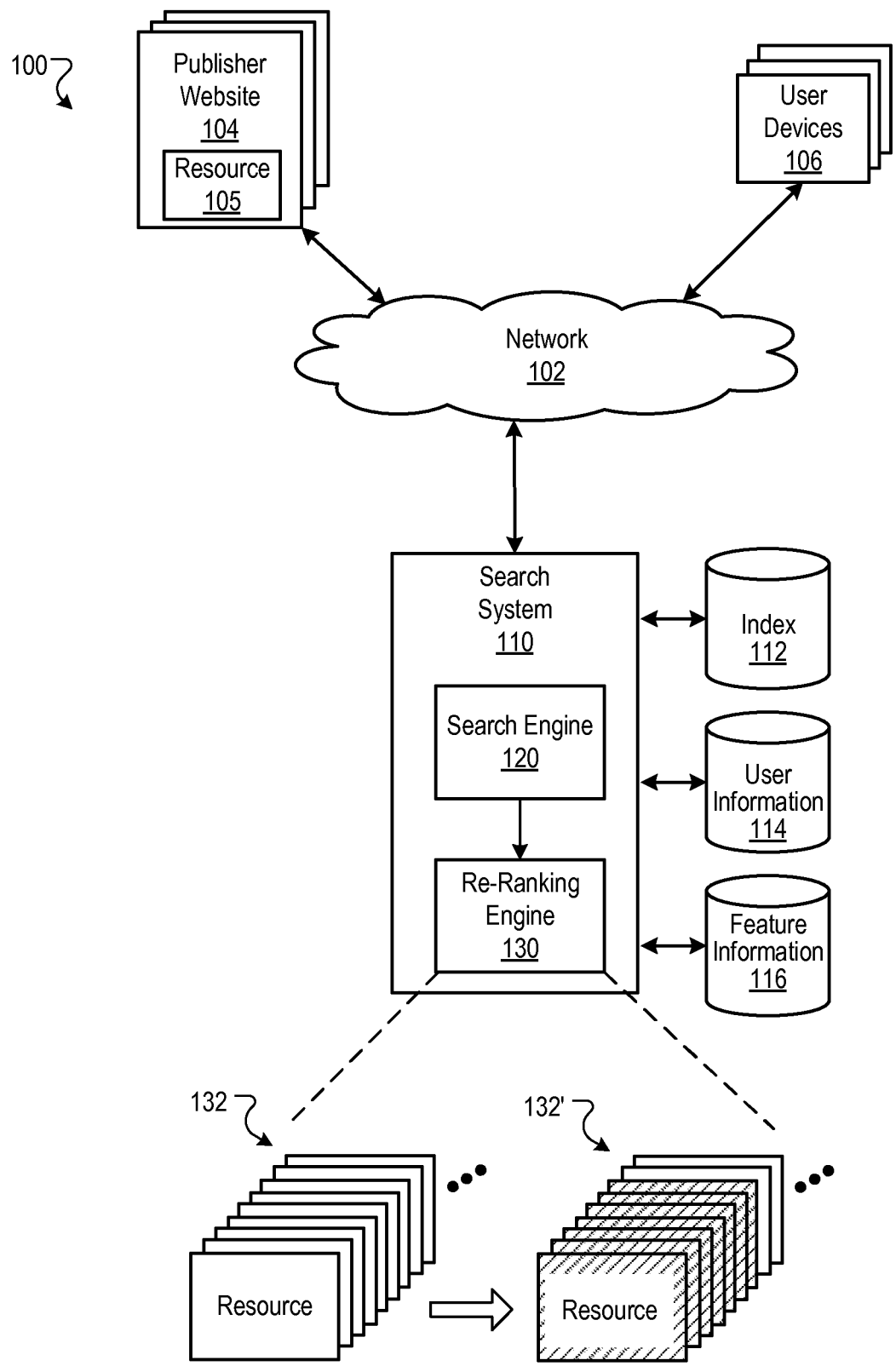
FIG. 1 is a block diagram of an example environment in which resources may be re-ranked based on features of the resources.

The systems and methods described in this written description facilitate the provision of resources according to a feature based ranking adjustment process that ensures feature diversity among resources. As used in this document, a resource is any presentable data item (webpage, blog post, image, video, etc.) that can be provided to a user device for presentation, and a feature is an identifiable attribute of the resource. Example features include video features that indicate whether resource is a video or includes a video; topic features that respectively indicate topics to which the resource is categorized; an author feature that indicates an author of the resource; a source feature the indicates a source of the resource, e.g., website, web page, application, etc.; and so on.

A search system, such as a search engine or a content recommendation system, receives data describing, for each resource in a set of resources to be provided to a user device, a first rank value of the resource relative to first rank values of other resources in the set, and a feature list that describes features of the resource. The first rank values determine ordinal positions of the resources in a ranking.

The system initially determines that a resource with a highest first rank value has a finalized ranking and that all other resources in the set do not have a finalized ranking. For each feature of the resources with a finalized ranking, a highest ordinal position of a resource with a finalized ranking that has the feature is determined. For the initial resource, each detected feature in that resource will have an ordinal position of 1.

The system then processes the remaining resources by selecting resources not having a finalized ranking. The selections are in a direction order, e.g., an ascending order of the ordinal positions, and for each selection the systems determine whether to finalize the ranking of the resource or to demote the resource. If a resource is to be demoted, the system demotes the resource to a demoted ordinal position relative to an ordinal position of another resource having a finalized ranking and a feature matching a feature of the resource being demoted. If the ranking of the resource is to be finalized, the ranking is finalized so that the resource is immediately subsequent in ordinal position to a resource for which the ranking was most recently finalized. Furthermore, when a ranking is finalized, the ordinal positions for the features of the resources with finalized rankings are again determined. These revised ordinal positions of the features are then used in determining whether to demote resources with unfinalized rankings, or to finalize their rankings. The process continues until all rankings are finalized, and then the resources may be provided to the user device according to the finalized rankings.

For example, assume resources are posts, snippets, and other data items that are determined to be of interest to a user and are ranked according to a first order. The resources are to be provided according to a rank queue P and are ordered according to the rank.

In some implementations, a demotion for a resource depends on the position of the last finalized resource having at least one feature in common with the resource. Each time a resource with a feature (F) and rank (R) is being considered to be provided to a user device, its ordinal position may be changed so that it is demoted by a certain number of positions (D) in the queue. The number of positions D may be the same for each feature F, or may be different for each feature, e.g., Dn for respective feature Fn.

Consider resources with finalized rankings—a first with a feature F1 at finalized rank R1 and a second with a feature F2 at finalized rank R2. Feature F1 has a demotion factor of D1, and feature F2 has a demotion factor of D2. Because the resource that includes feature F1 is at a finalized rank R1, the value R1 is used as a base value for demotion for other resources that include the feature F1. Likewise, because the resource that includes feature F2 is at the finalized rank R2, the value R2 is used as a base value for demotion for other resources that include the feature F2.

A resource that has not yet been provided is at rank R3, and includes features F1 and F2. The rank of the resource, in some implementations, is updated to a maximum of (R1+D1, R2+D2, and R3). A similar calculation is performed for each resource remaining in the queue to be provided, and the resources are re-ordered according to the adjusted ranking. If the ranking R3 is lower than R1+D1 and R2+D2, then the resource is finalized. Otherwise, the resource is demoted and subsequent resources are checked.

Each time another resource is finalized, the system determines, for each feature of the resources with a finalized ranking, a highest ordinal position of a resource with a finalized ranking that has the feature. This results in a set of features and corresponding ordinal positions that are used in the demotion or finalization of rankings of subsequently processed resources.

In other implementations, each time another resource is finalized, the system determines, for each feature of the resources with a finalized ranking, all the ordinal positions of finalized resources that have the feature. The ordinal positions are input into a function that determines a demotion based on the ordinal positions.

These features and additional features are described in more detail below.

FIG. 1 is a block diagram of an example environment 100 in which resources may be re-ranked based on an adjusted search operation. A computer network 102, such as the Internet, connects publisher websites 104, user devices 106, and a search system 110. The online environment 100 may include many thousands of publisher websites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. The website provides resources 105.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of and/or the providing of these resources 105, the search system 110 indexes the resources 105 provided by the publisher websites 104. The indexed data are stored in an index 112.

The user devices 106 request resources 105. The request may be explicit, as in the issuing of user query by the user device 106. In response to the queries, the search system 110 uses the index 112 to identify resources that are relevant to the queries. The search system 110 uses a search engine 120 that identifies the resources in the form of search results 132 and returns the search results 132 to the user devices 106 in a search results page resource. A search result is data generated by the search system 110 that identifies a resource that satisfies a particular search query, and includes a resource locator, or some other identifier, for the resource. An example search result can include a web page title, a snippet of text extracted from the web page, and the URL of the web page.

Alternatively, the request may be implicit, such as when a user device displays a social network environment for a user's account and content suggestions are provided to the user device. Such content suggestions may include posts of friends of the user, articles, videos or images in which the user may be interested, and so on. The search system 110 can access user information 114 to determine preferences of the user and relationships of the user to other users to determine which resources to provide to the user.

The resources may be directly provided to the user device 106, such as in the case of a blog post, image, etc., or may be indirectly provided to the user device 106, such as in the case of a search result that links to the resource. Thus, the phrase "providing a resource to a user device" covers both directly providing and indirectly providing a resource to the user device.

The search results 132 are ordered in a first order according to the search scores determined by the search engine 120. A re-ranking engine 130 re-ranks the search results 132 based on the features of the resources referenced by the search results and the ordinal rank of the resources relative to the other resources.

Figure 2A:
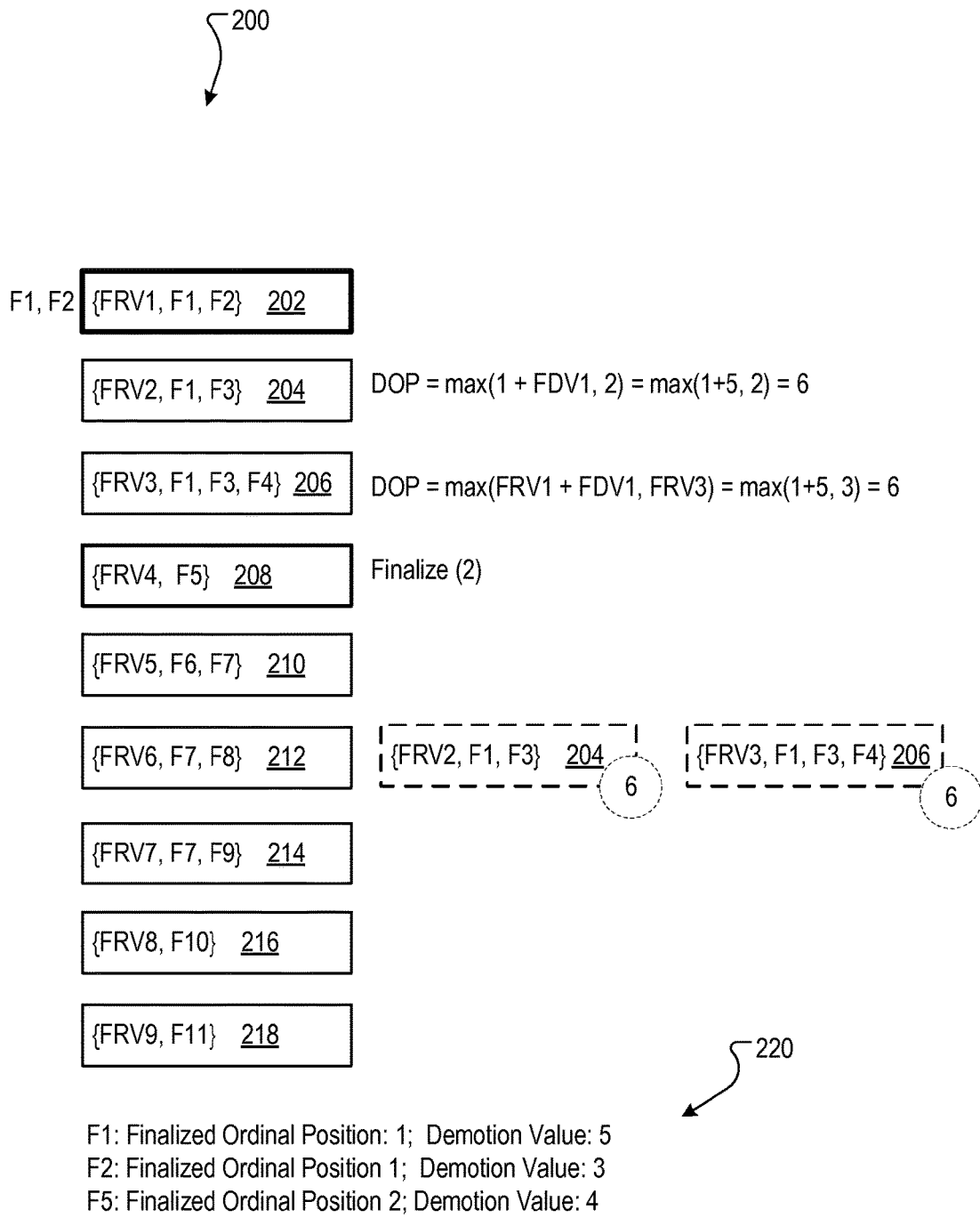
FIGS. 2A-2G illustrate the re-ranking of resources based on detected features of each resource in a set of ranked resources.
Figure 2B:
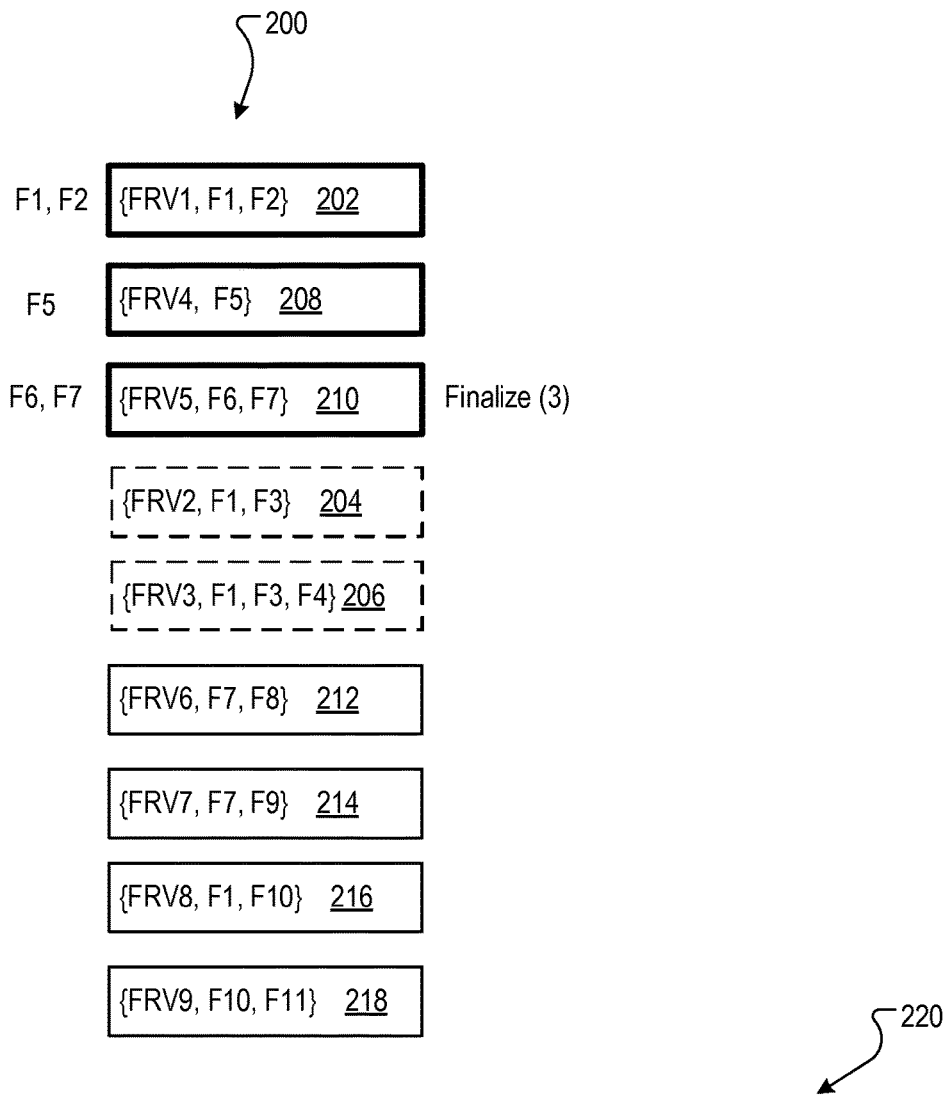
Figure 2C:
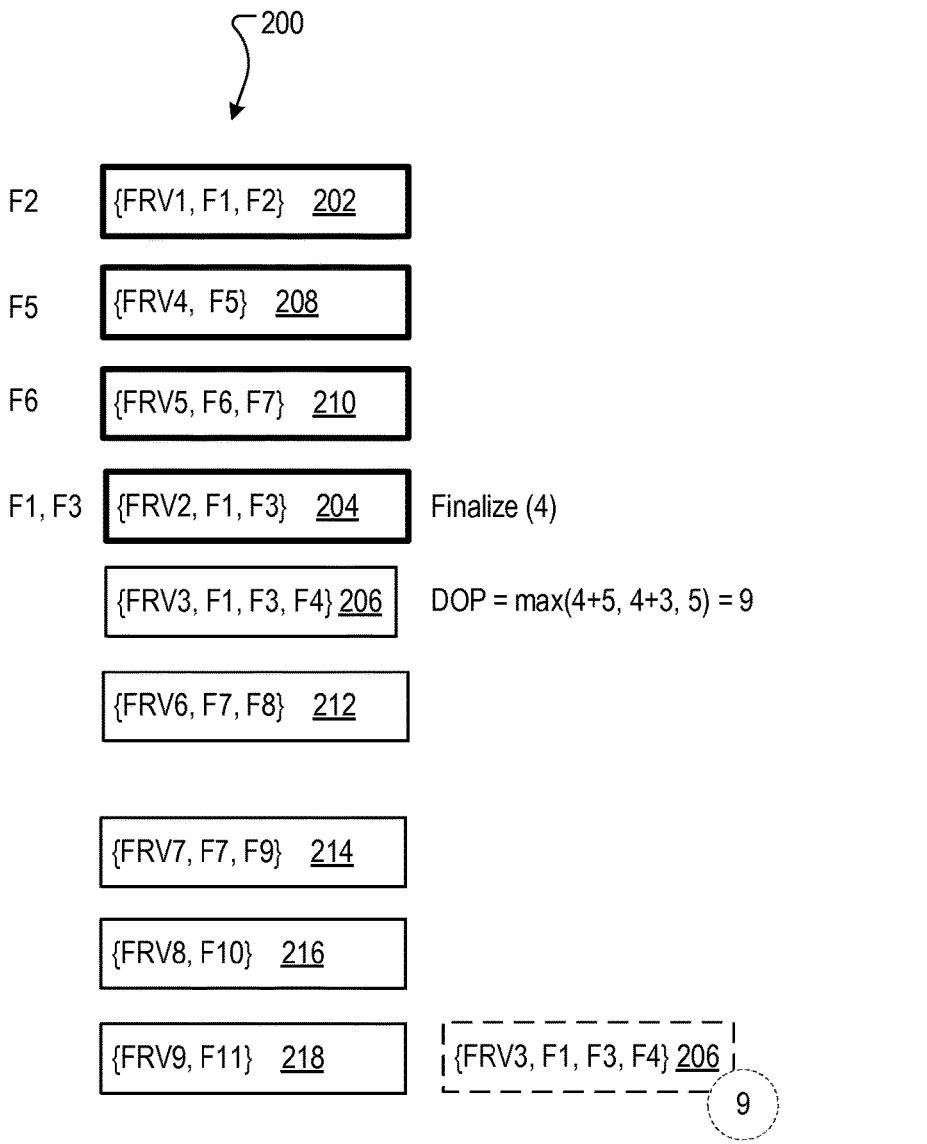
Figure 2D:
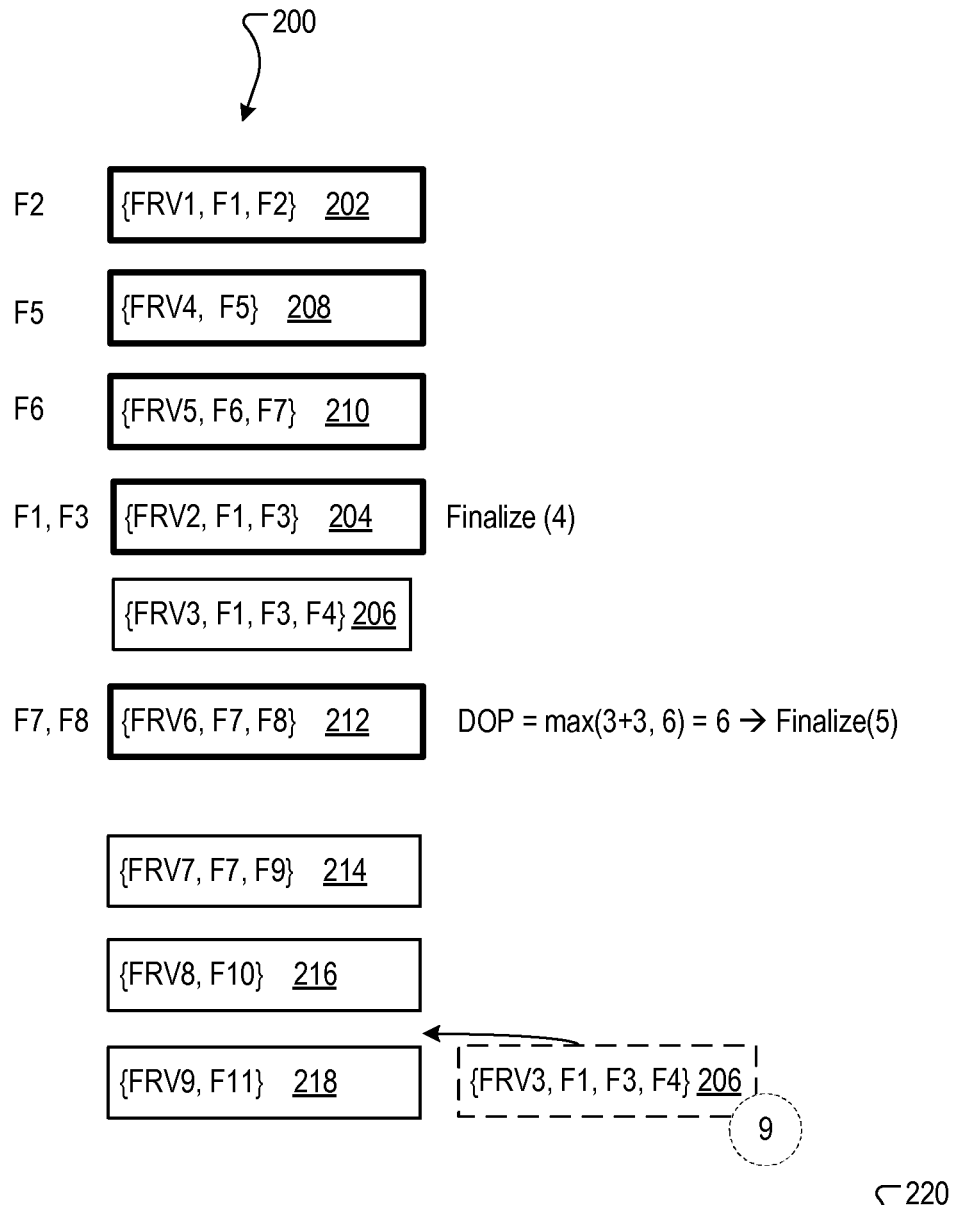

The processes for re-ranking the resources is described with reference to FIGS. 2A-2C and FIG. 3 below. In particular, FIGS. 2A-2G illustrate the re-ranking of resources based on detected features of each resource in a set of ranked resource. The flow of FIGS. 2A-2C is described with reference to FIG. 3, which is a flow diagram of an example process 300 for re-ranking of resources based on detected features of each resource in a set of ranked resources. The process 300 can be implemented in one or more computers of a data processing apparatus.

The process 300 receives data describing, for each resource in a set of resources to be provided to a user device, a first rank value of the resource, and a feature list that describes features of the resource (302). For example, the re-ranking engine 130 may receive data describing an ordinal list of ranked resource 202-218, as shown in FIG. 2A, and the features Fn of each resource. The features may be identified by a separate process, or the data describing the features may be accessed from a data store, such as the feature information 116 of FIG. 1.

As depicted in FIG. 2A, a set of resources 200 include resources 202-218 that are ordered according to a first ranking by respective first rank values (FRV1 for resource 202, which is ranked first; FRV2 for resource 204, which is ranked second; and so on). Additionally, data describing the features F of each resource is provided. For example, the data describes two identified features F1 and F2 of resource 202; two identified features F1 and F3 of resource 204; and so on.

As described above, each feature Fn may describe a particular attribute of a resource. Additionally, each feature may have a different feature demotion value FDV. For example, feature F1 may have a feature demotion value FDV1 of 5. Likewise, feature F2 may have a feature demotion value FDV2 of 3. Demotion values are used to demote resources to demoted ordinal positions, as will be described in more detail below.

The process 300 determines the resource with a highest first rank value has a finalized ranking (304). As shown in FIG. 2A, the resource 202 is represented by a bolded outline. This indicates the ranking of the resource 202 has been finalized, as it is the first resource to be considered in the set.

The process 300 determines, for each feature of the resources with a finalized ranking, a highest ordinal position of a resource with a finalized ranking that has the feature (306). For example, when resource 202 is finalized in its ranking, it is the only resource with a finalized ranking. Thus, both features F1 and F2 have finalized ordinal positions of 1.

Suppose, however, at a later time, a resource with feature F1 is finalized in ordinal position 4, which means that four resources have finalized ranks. Because the resource at ordinal position 4 has an ordinal position higher than the resource at ordinal potion 1, the finalized ordinal position for the feature F1 will be updated to 4. For now, however, assume that only the ranking of resource 202 is finalized.

The process 300 selects resource not having a finalized ranking, and the selections are in ascending order of the ordinal positions (308). For example, with reference to FIG. 2A, the process 300 will select resource 204, as it is next in ascending ordinal position from either the last selected resource or the resource with the most recently finalized ranking.

The process 300 determines whether to finalize the ranking of the selected resource or to demote the selected resource (310). There are several conditions that may result in a ranking being finalized, and if a ranking is not finalized, then the resource will be demoted to a demoted ordinal position.

One condition for finalizing occurs when features of the resource do not match any features of the resources with a finalized ranking. In FIG. 2A, the resource 204 has feature F1, which matches feature F1 of the resource 202, so this condition is not met.

Another condition for finalizing occurs when the selected resource was previously demoted based on a particular feature and is a first occurrence of a previously demoted resource based on the particular feature. In FIG. 2A, however, the resource was not previously demoted, so this condition is not met.

In some implementations, if the conditions described above are not met, rank adjustment values for the resource are determined, and based on these values, the system determines whether to demote the resource or finalize the ranking of the resource. The process 300 determines the ordinal position of the resource, which, in this case, is 2. The process 300 then determines rank adjustment values that are based on features of the resource that match features of resources having a finalized ranking and the highest ordinal positions determined for the features. In FIG. 2A, there is only one matching feature F1, which has a finalized ordinal position of 1. Feature F1 has a demotion value of 5. The process determines a demoted ordinal position that is a maximum of 1) the sum of each matching feature demotion value and the finalized ordinal position of the resource having that feature; and 2) the ordinal position of the selected resource. In FIG. 2A, for resource 202 the demoted ordinal position is 6 (max((1+5, 2)). When the ordinal position of the selected resource is less than calculated determined demoted ordinal position, then the resource is demoted to the demoted ordinal position. In FIG. 2A, the ordinal position of the selected resource is 2, which is less than 6, so the selected resource is demoted to position 6, as indicated by the resource 202 in phantom a position 6.

Thus, in FIG. 2A, in response to determining to demote the selected resource 202, the process 300 demotes the resource 202 (312) and returns to step 308. Resource 206 is then selected, and like resource 204, it too is demoted to position 6 based on feature F1. The process 300 then returns to 308 and selects resource 208.

However, resource 208 does not have a feature that matches any feature of any resource with a finalized rank. This is because resource 208 has feature F5, and the only features in the resource(s) with a finalized rank are features F1 and F2. Accordingly, the process 300 finalizes the ranking of the resource so that it is immediately subsequent in ordinal position to a resource with a most recently finalized ranking (314). Thus, the rank of resource 208 is finalized as ordinal position 2, as resources 204 and 206 have been demoted to position 6, and the most previously finalized rank is 1.

The process 300 then determines if there are more resources with unfinalized rankings (316). As there are additional resources with unfinalized rankings the process returns to step 306, and determines, for each feature of the resources with a finalized ranking, a highest ordinal position of a resource with a finalized ranking that has the feature. The results are shown in table 200 of FIG. 2A, and the finalization of the ranking of resource 208 is indicated by the bolded outline representation.

As shown in FIG. 2B, the process 300 then selects the next resource with an unfinalized ranking, resource 210. Because the resource 210 does not have a feature that matches any feature of any resource with a finalized rank, i.e., features F6 and F7 are features of the resources 202 and 208, resource 210 is also finalized. Again, as there are more resources with an unfinalized rank, the process 300 again determines for each feature of the resources with a finalized ranking, a highest ordinal position of a resource with a finalized ranking that has the feature. The results are shown in table 200 of FIG. 2B, and the finalization of the ranking of resource 210 is indicated by the bolded outline representation.

Referring back to FIG. 2A, resource 204 is the first of two resources —204 and 206—that were demoted based on feature F1. While resource 204, 206 and 212 of FIG. 2A each are initially tied for the same ordinal position of 6, the tie is resolved based on their respective first rank values. In particular, for two or more resources that occupy a same ordinal position, the demoted ordinal positions of the resources are adjusted so that the two or more resources are sequentially ordered in a descending, non-intervening order based on the first rank values of the two more resources. Thus, 204 is at a lower ordinal position than 206, and 206 is at a lower ordinal position than 212. This ensures that the rankings of the resources that are tied in demotion are resolved according to their original relative rankings.

As shown in FIG. 2C, the process 300 will then select resource 204, which was previously demoted. While the resource 204 does have features that match a feature of a resource with a finalized rank—feature F1 matches feature F1 of 202, it does meet a separate condition for finalization. Specifically, a selected resource may be finalized when the selected resource was previously demoted based on a particular feature and is a first occurrence of a previously demoted resource based on the particular feature.

Accordingly, resource 204 is finalized in position 4. The process 300 then determines if there are more resources with unfinalized rankings (316). As there are additional resources with unfinalized rankings the process returns to step 306, and determines, for each feature of the resources with a finalized ranking, a highest ordinal position of a resource with a finalized ranking that has the feature. The results are shown in table 200 of FIG. 2C. Note that feature F1 now has a finalized ordinal positions of 4, as that ordinal position is the highest finalized ordinal position at which a resource with the feature F1 is positioned.

The process 300 then selects resource 206. While resource 206 was previously demoted, it will not be finalized in the manner resource 204 was finalized because it is not the first occurrence of a previously demoted resource based on the particular feature F1. Instead, because the feature F1 has been updated with a new finalized ordinal position of 4, the resource 206 will be demoted.

The process 300 determines a demoted ordinal position that is a maximum of 1) the sum of each matching feature demotion value and the finalized ordinal position of the resource having that feature; and 2) the ordinal position of the selected resource. Here the resource 206 includes two features—F1 and F3—that have finalized ordinal positions, and thus the demoted ordinal position is the maximum of 9 (for feature F1), 7 (for feature F3) and 5 (the ordinal position of the selected resource). Resource 206 is thus demoted to ordinal position 9.

When the resource 212 is selected and processed, it is finalized because its ordinal position is the same as (or greater than) the demoted ordinal position based on the feature F7. Accordingly, because it will not be demoted from its current ordinal position, its ranking is finalized. Here resource 212 will be finalized to position 5, as resource 206 was demoted to position 9. Again the finalized ordinal positions for the features are updated as shown in table 220 of FIG. 2D. Additionally, resource 206 will occupy ordinal position 8, as it has a first rank value (3) lower than the first rank value of resource 218 (9).

Figure 2E:
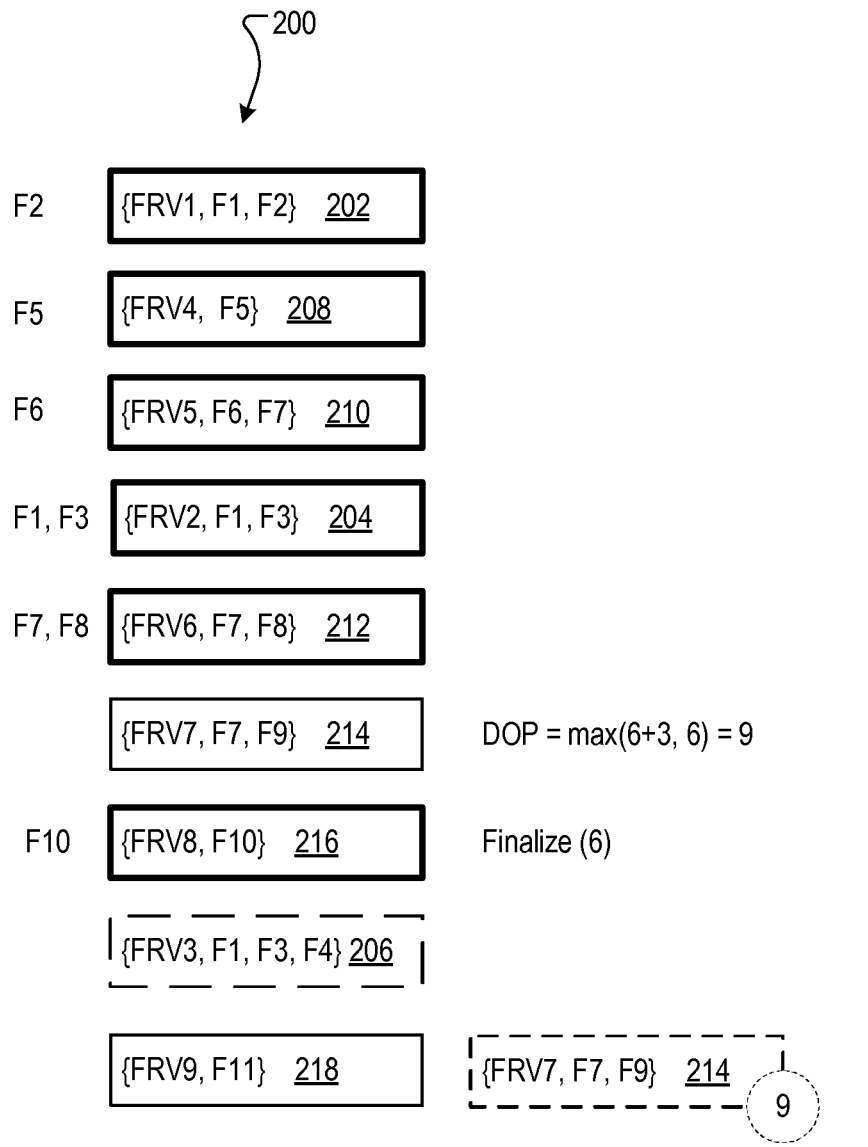

FIG. 2E illustrates several more stages in the processing of the resource set 200. Resource 214 is demoted, and the ranking of resource 216 is finalized, resulting in the updated table 220.

Figure 2F:
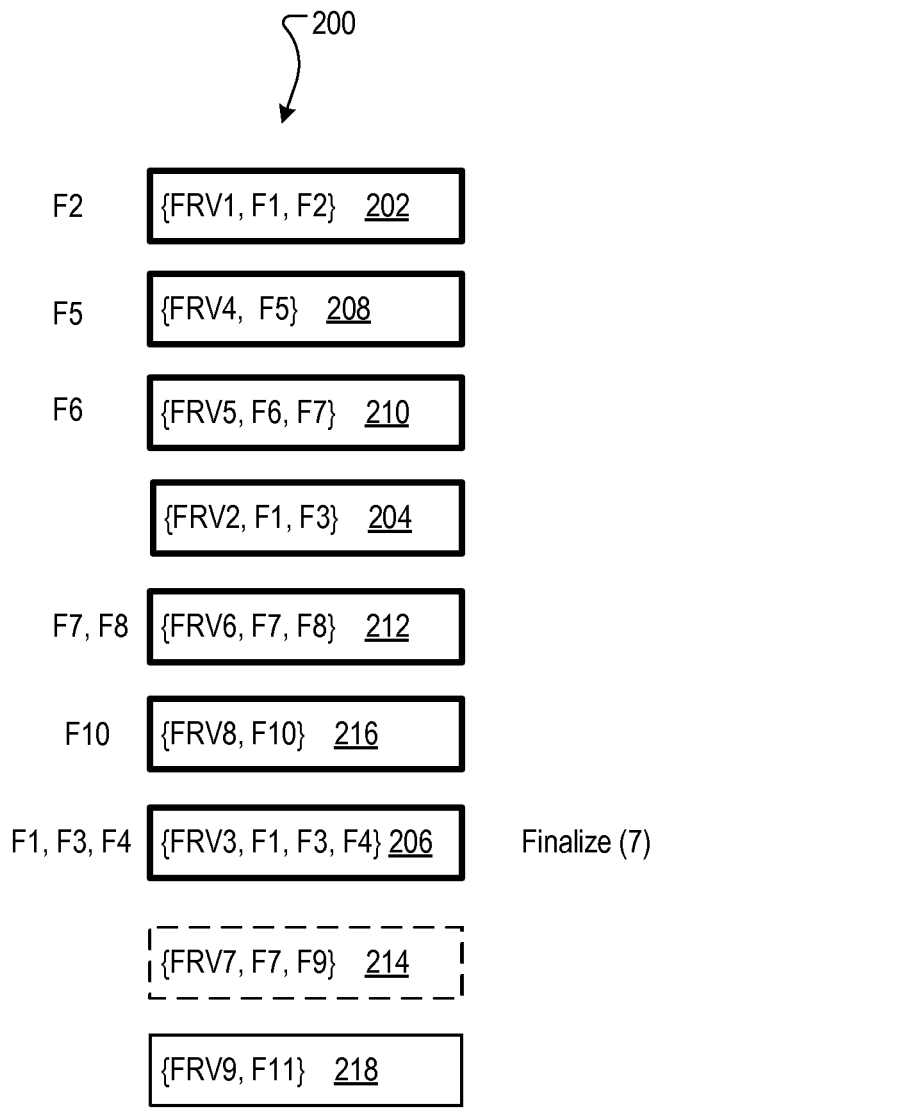

In FIG. 2F, resource 206 is finalized, as it the first instance of a recently demoted resource with respect to the table 220 of FIG. 2E. The ranking of the resource 206 is finalized, the table 220 is updated as shown in FIG. 2F, and the next resource 214 is selected.

Figure 2G:
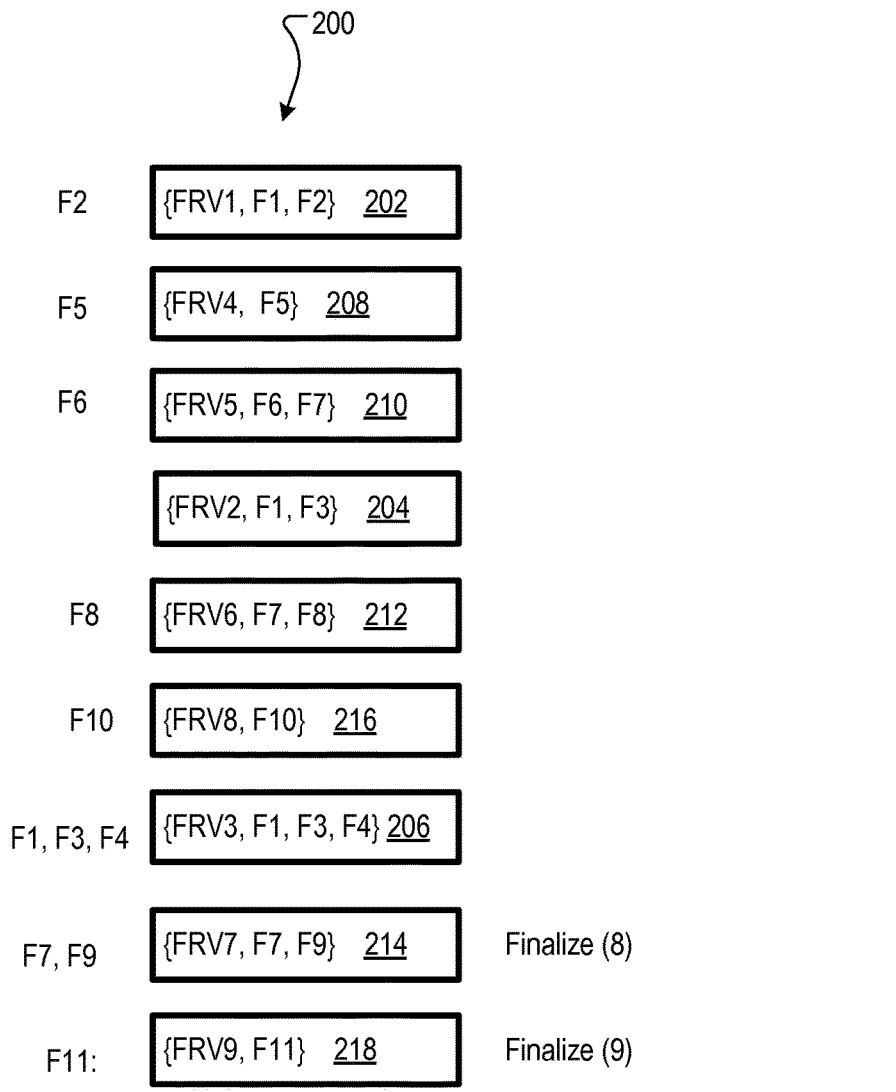
Figure 3:
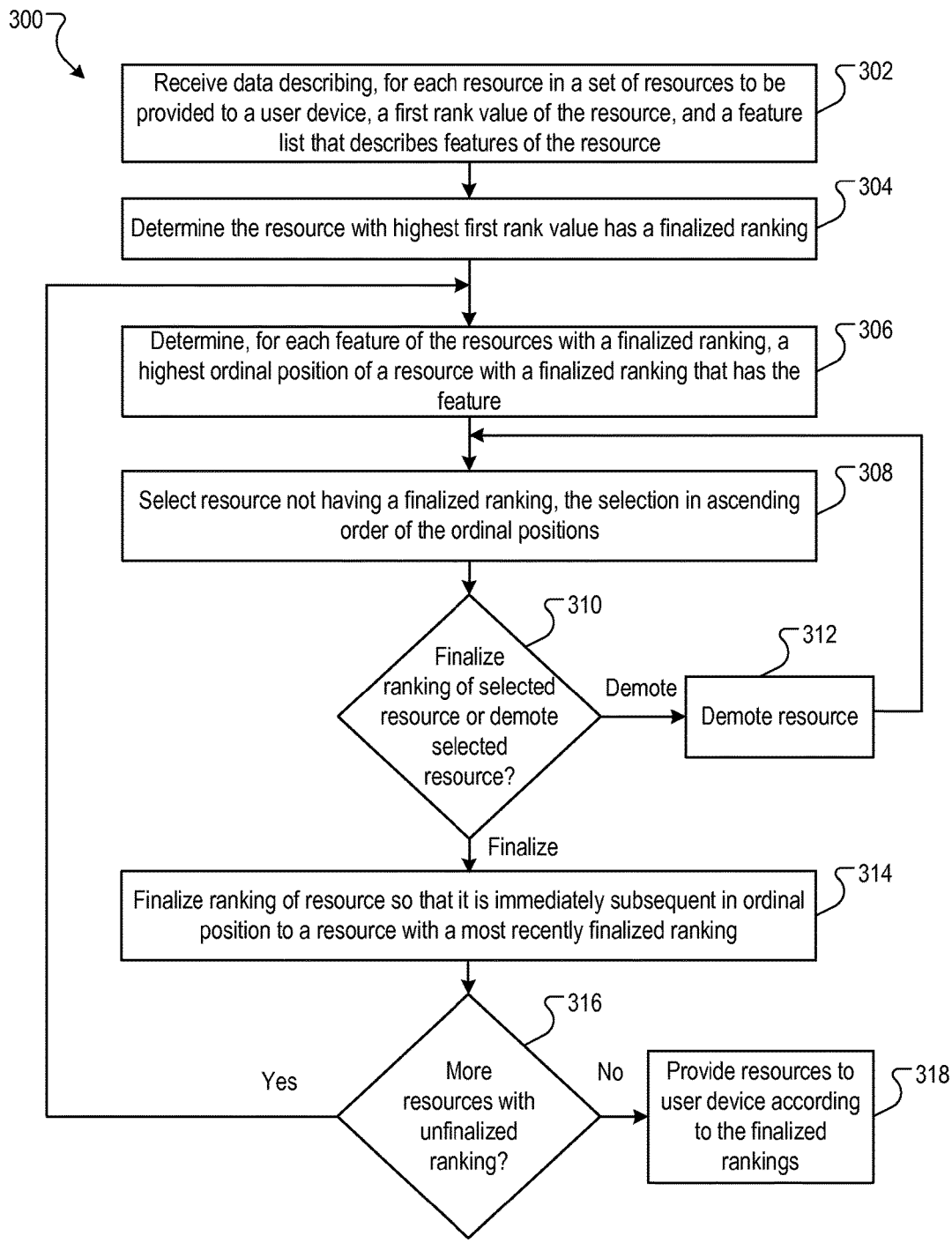
FIG. 3 is a flow diagram of an example process for re-ranking of resources based on detected features of each resource in a set of ranked resources.

In FIG. 2G, resource 214 is finalized at ordinal position 8 because the demotion based on feature F7 (ordinal position 8) is the same as the current ordinal position the resource 214.

Finally, resource 218 will be finalized as it is the last resource, and it cannot be demoted beyond its current ordinal position.

In some implementations, modifications to the feature demotion values may be made when a modification condition is met. For example, assume a "same author" demotion value is 5; however, if the author is a friend of the user as indicated by a social network relationship, then the demotion value may be modified to the value of 3.

Another modification factor is value demotion selection modification. For example, suppose a "Friend" feature demotion value is 5, but a "Family" feature demotion value is 4. Assume that an author of a resource has both a "Family" and "Friend" relationship. In such a situation where features overlap for two feature demotion values, and the features are subject to a value selection criterion, a minimum demotion value may be selected and used. In this example, the demotion value of 4 would be used, and the value of 5 would be ignored.

Other conditions to modify demotion values may also be used. For example, in some implementations, each time another resource is finalized, the system determines, for each feature of the resources with a finalized ranking, all the ordinal positions of finalized resources that have the feature. The ordinal positions are input into a function that determines a demotion based on the ordinal positions.

To illustrate, assume the feature F1 appears in resources with finalized positions 1, 4 and 9. The function to determine the demotion value for the next resource at an ordinal position P that includes that feature may be, for example:

Demotion Value=Max($F(\{1,4,9\})$,$P$)

Where $F(\{R\})$ is a function that outputs an ordinal position for a feature F based ordinal positions $\{R\}$ of finalized resources. For example, in one implementation, the function may be realized according to the following formula:

$F(\{R\})$=Max($\{R\}$)+Card$\{(R)\}$+$FDV$

Where:
Max($\{R\}$) is the maximum ordinal position in the set $\{R\}$;
Card($\{R\}$) is the cardinality of the set $\{R\}$; and
FDV is the feature demotion value for the feature.

Thus, as the set $\{R\}$ increases in size, the demotion will increase. Other functions may also be used.

The examples described above are illustrative, and the process can be modified so long as the feature based ranking adjustment is realized. For example, in some implementations, the system determines, relative to first ranks of other resources that a resource with a particular first rank value has a finalized ranking and that other resources in the set do not have a finalized ranking. The system may then determine, relative to other ordinal positions, for each feature of the resources with a finalized ranking, a particular ordinal position of a resource with a finalized ranking that has the feature. The system then selects resources not having a finalized ranking. The selections is in a directional order of the ordinal positions. For each selection, the system determines whether to finalize the ranking of the resource or to demote the resource. In response to determining to demote the resource, the system demotes the resource to a demoted ordinal position relative to an ordinal position of another resource having a finalized ranking and a feature matching a feature of the resource. On the other hand, in response to determining to finalize the ranking of the resource, the system finalizes the ranking of the resource so that it is subsequent in ordinal position to a resource for which the ranking was previously finalized, and then determines, relative to other ordinal positions for each feature of the resources with a finalized ranking, a particular ordinal position of a resource with a finalized ranking that has the feature.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving data describing, for each resource in a set of resources ordered in ordinal positions and to be provided to a user device:
   a first rank value of the resource relative to first ranks of other resources in the set and defining an ordinal position of the resource relative to the other resources in the set; and
   a feature list that describes features of the resource, each feature being an identified attribute of the resource;
   determining relative to first ranks of other resources that a resource with a particular first rank value has a finalized ranking and that other resources in the set do not have a finalized ranking;

determining, relative to other ordinal positions, for each feature of the resources with a finalized ranking, a particular ordinal position of a resource with a finalized ranking that has the feature;

selecting resources not having a finalized ranking, the selections in a directional order of the ordinal positions, and for each selection determining whether to finalize the ranking of the resource or to demote the resource;

in response to determining to demote the resource, demoting the resource to a demoted ordinal position relative to an ordinal position of another resource having a finalized ranking and a feature matching a feature of the resource;

in response to determining to finalize the ranking of the resource:

finalizing the ranking of the resource so that it is subsequent in ordinal position to a resource for which the ranking was previously finalized; and determining, relative to other ordinal positions for each feature of the resources with a finalized ranking, a particular ordinal position of a resource with a finalized ranking that has the feature;

providing, to the user device, at least one of the resources according to the finalized ranking.

2. The method of claim 1, wherein determining whether to finalize the ranking of the resource or to demote the resource comprises:

finalizing the ranking of the resource in response to determining the features of the resource do not match any features of the resources with a finalized ranking.

3. The method of claim 1, wherein determining whether to finalize the ranking of the resource or to demote the resource comprises:

finalizing the ranking of the resource in response to determining that the resource is at an ordinal position that is higher than a demoted ordinal position that is relative to an ordinal position of another resource having a finalized ranking and a feature matching a feature of the resource.

4. The method of claim 1, wherein determining whether to finalize the ranking of the resource or to demote the resource comprises:

finalizing the ranking of the resource in response to determining that the resource is at a demoted ordinal position.

5. The method of claim 4, wherein finalizing the ranking of the resource in response to determining that the resource is at a demoted ordinal position comprises:

finalizing the ranking of the resource only in response to determining that the resources is at a lowest demoted ordinal position relative other resources that are at demoted ordinal positions.

6. The method of claim 1, wherein determining whether to finalize the ranking of the resource or to demote the resource comprises:

determining the ordinal position of the resource;

determining rank adjustment values that are based on features of the resource that match features of resources having a finalized ranking and highest ordinal positions determined for the features;

for each rank adjustment value, determining a demoted ordinal position based on the rank adjustment value and an ordinal position of a resource having a finalized ranking;

finalizing the ranking of the resource when the ordinal position of the resource is higher than each demoted ordinal position determined; and demoting the resource to the demoted ordinal position that is lowest of the demoted ordinal positions when the ordinal position of the resource is higher than at least one of the demoted ordinal positions.

7. The method of claim 1, wherein for each of two or more resources that are demoted to a same demoted ordinal position, adjusting the demoted ordinal positions of the resource so that the two or more resources are sequentially ordered in a descending, non-intervening order based on the first rank values of the two or more resources.

8. The method of claim 1, wherein the rank adjustment value for a first feature is different from the rank adjustment value for a second feature that is different from the first feature.

9. The method of claim 1, wherein the features include a video feature that indicates the resource includes a video, a topic feature that respectively indicate topics to which the resource is categorized; and an author feature that indicates an author of the resource.

10. The method of claim 1, wherein:

a lowest ordinal position is a first position in the ranking;

determining relative to first ranks of other resources that a resource with a particular first rank value has a finalized ranking and that other resources in the set do not have a finalized ranking comprises determining that a resource with a highest first rank value has a finalized ranking and that all other resources in the set do not have a finalized ranking;

determining, relative to other ordinal positions, for each feature of the resources with a finalized ranking, a particular ordinal position of a resource with a finalized ranking that has the feature comprises, determining, for each feature of the resources with a finalized ranking, a highest ordinal position of a resource with a finalized ranking that has the feature;

selecting resources not having a finalized ranking, the selections in a directional order of the ordinal positions comprises selecting resources not having a finalized ranking, the selections in an ascending order of the ordinal positions;

finalizing the ranking of the resource so that it is subsequent in ordinal position to a resource for which the ranking was previously finalized comprises finalizing the ranking of the resource so that it is immediately subsequent in ordinal position to a resource for which the ranking was most recently finalized;

determining, relative to other ordinal positions for each feature of the resources with a finalized ranking, a particular ordinal position of a resource with a finalized ranking that has the feature comprises determining, for each feature of the resources with a finalized ranking, a highest ordinal position of a resource with a finalized ranking that has the feature; and providing, to the user device, at least one of the resources according to the finalized ranking comprises providing, in response to determining that each resource in the set of resources have a finalized ranking, at least one of the resources according to the finalized ranking.

11. A system, comprising:

a data processing apparatus that includes one or more computers; and a non-transitory computer storage medium encoded with a computer program, the program comprising instructions that when executed by a data processing apparatus cause the data processing apparatus to perform operations comprising:

receiving data describing, for each resource in a set of resources ordered in ordinal positions and to be provided to a user device:
  a first rank value of the resource relative to first ranks of other resources in the set and defining an ordinal position of the resource relative to the other resources in the set; and
  a feature list that describes features of the resource, each feature being an identified attribute of the resource;
determining relative to first ranks of other resources that a resource with a particular first rank value has a finalized ranking and that other resources in the set do not have a finalized ranking;
determining, relative to other ordinal positions, for each feature of the resources with a finalized ranking, a particular ordinal position of a resource with a finalized ranking that has the feature;
selecting resources not having a finalized ranking, the selections in a directional order of the ordinal positions, and for each selection determining whether to finalize the ranking of the resource or to demote the resource;
  in response to determining to demote the resource, demoting the resource to a demoted ordinal position relative to an ordinal position of another resource having a finalized ranking and a feature matching a feature of the resource;
  in response to determining to finalize the ranking of the resource:
    finalizing the ranking of the resource so that it is subsequent in ordinal position to a resource for which the ranking was previously finalized; and
    determining, relative to other ordinal positions for each feature of the resources with a finalized ranking, a particular ordinal position of a resource with a finalized ranking that has the feature;
providing, to the user device, at least one of the resources according to the finalized ranking.

12. The method of claim 11, wherein determining whether to finalize the ranking of the resource or to demote the resource comprises:
  finalizing the ranking of the resource in response to determining the features of the resource do not match any features of the resources with a finalized ranking.

13. The system of claim 11, wherein determining whether to finalize the ranking of the resource or to demote the resource comprises:
  finalizing the ranking of the resource in response to determining that the resource is at an ordinal position that is higher than a demoted ordinal position that is relative to an ordinal position of another resource having a finalized ranking and a feature matching a feature of the resource.

14. The system of claim 11, wherein determining whether to finalize the ranking of the resource or to demote the resource comprises:
  finalizing the ranking of the resource in response to determining that the resource is at a demoted ordinal position.

15. The system of claim 14, wherein finalizing the ranking of the resource in response to determining that the resource is at a demoted ordinal position comprises:
  finalizing the ranking of the resource only in response to determining that the resources is at a lowest demoted ordinal position relative other resources that are at demoted ordinal positions.

16. The system of claim 11, wherein determining whether to finalize the ranking of the resource or to demote the resource comprises:
  determining the ordinal position of the resource;
  determining rank adjustment values that are based on features of the resource that match features of resources having a finalized ranking and highest ordinal positions determined for the features;
  for each rank adjustment value, determining a demoted ordinal position based on the rank adjustment value and an ordinal position of a resource having a finalized ranking;
  finalizing the ranking of the resource when the ordinal position of the resource is higher than each demoted ordinal position determined; and
  demoting the resource to the demoted ordinal position that is lowest of the demoted ordinal positions when the ordinal position of the resource is higher than at least one of the demoted ordinal positions.

17. The system of claim 11, wherein:
a lowest ordinal position is a first position in the ranking;
determining relative to first ranks of other resources that a resource with a particular first rank value has a finalized ranking and that other resources in the set do not have a finalized ranking comprises determining that a resource with a highest first rank value has a finalized ranking and that all other resources in the set do not have a finalized ranking;
determining, relative to other ordinal positions, for each feature of the resources with a finalized ranking, a particular ordinal position of a resource with a finalized ranking that has the feature comprises, determining, for each feature of the resources with a finalized ranking, a highest ordinal position of a resource with a finalized ranking that has the feature;
selecting resources not having a finalized ranking, the selections in a directional order of the ordinal positions comprises selecting resources not having a finalized ranking, the selections in an ascending order of the ordinal positions;
finalizing the ranking of the resource so that it is subsequent in ordinal position to a resource for which the ranking was previously finalized comprises finalizing the ranking of the resource so that it is immediately subsequent in ordinal position to a resource for which the ranking was most recently finalized;
determining, relative to other ordinal positions for each feature of the resources with a finalized ranking, a particular ordinal position of a resource with a finalized ranking that has the feature comprises determining, for each feature of the resources with a finalized ranking, a highest ordinal position of a resource with a finalized ranking that has the feature; and
providing, to the user device, at least one of the resources according to the finalized ranking comprises providing, in response to determining that each resource in the set of resources have a finalized ranking, at least one of the resources according to the finalized ranking.

18. A non-transitory computer storage medium encoded with a computer program, the program comprising instructions that when executed by a data processing apparatus cause the data processing apparatus to perform operations comprising:
  receiving data describing, for each resource in a set of resources ordered in ordinal positions and to be provided to a user device:

a first rank value of the resource relative to first ranks of other resources in the set and defining an ordinal position of the resource relative to the other resources in the set; and a feature list that describes features of the resource, each feature being an identified attribute of the resource;

determining relative to first ranks of other resources that a resource with a particular first rank value has a finalized ranking and that other resources in the set do not have a finalized ranking;

determining, relative to other ordinal positions, for each feature of the resources with a finalized ranking, a particular ordinal position of a resource with a finalized ranking that has the feature;

selecting resources not having a finalized ranking, the selections in a directional order of the ordinal positions, and for each selection determining whether to finalize the ranking of the resource or to demote the resource;

in response to determining to demote the resource, demoting the resource to a demoted ordinal position relative to an ordinal position of another resource having a finalized ranking and a feature matching a feature of the resource;

in response to determining to finalize the ranking of the resource:

finalizing the ranking of the resource so that it is subsequent in ordinal position to a resource for which the ranking was previously finalized; and determining, relative to other ordinal positions for each feature of the resources with a finalized ranking, a particular ordinal position of a resource with a finalized ranking that has the feature;

providing, to the user device, at least one of the resources according to the finalized ranking.

19. The non-transitory computer storage medium of claim 18, wherein:

a lowest ordinal position is a first position in the ranking;

determining relative to first ranks of other resources that a resource with a particular first rank value has a finalized ranking and that other resources in the set do not have a finalized ranking comprises determining that a resource with a highest first rank value has a finalized ranking and that all other resources in the set do not have a finalized ranking;

determining, relative to other ordinal positions, for each feature of the resources with a finalized ranking, a particular ordinal position of a resource with a finalized ranking that has the feature comprises, determining, for each feature of the resources with a finalized ranking, a highest ordinal position of a resource with a finalized ranking that has the feature;

selecting resources not having a finalized ranking, the selections in a directional order of the ordinal positions comprises selecting resources not having a finalized ranking, the selections in an ascending order of the ordinal positions;

finalizing the ranking of the resource so that it is subsequent in ordinal position to a resource for which the ranking was previously finalized comprises finalizing the ranking of the resource so that it is immediately subsequent in ordinal position to a resource for which the ranking was most recently finalized;

determining, relative to other ordinal positions for each feature of the resources with a finalized ranking, a particular ordinal position of a resource with a finalized ranking that has the feature comprises determining, for each feature of the resources with a finalized ranking, a highest ordinal position of a resource with a finalized ranking that has the feature; and providing, to the user device, at least one of the resources according to the finalized ranking comprises providing, in response to determining that each resource in the set of resources have a finalized ranking, at least one of the resources according to the finalized ranking.

* * * * *

UNITED STATES PATENT AND TRADEMARK OFFICE
CERTIFICATE OF CORRECTION

Page 1 of 1

PATENT NO. : 10,055,463 B1
APPLICATION NO. : 14/946233
DATED : August 21, 2018
INVENTOR(S) : Chandrasekaran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this
Twenty-third Day of April, 2019

Andrei Iancu
*Director of the United States Patent and Trademark Office*